United States Patent [19]

Bailey

[11] Patent Number: 5,701,771
[45] Date of Patent: Dec. 30, 1997

[54] HANDLEBAR LOCKING DEVICE

[76] Inventor: Robert V. Bailey, 819 N. 31 Rd., Hollywood, Fla. 33021

[21] Appl. No.: 438,158

[22] Filed: May 8, 1995

[51] Int. Cl.$^6$ ................................................. B60R 25/00
[52] U.S. Cl. .................... 70/233; 70/58; 70/163; 70/169; 70/199; 70/238; 70/244
[58] Field of Search ...................... 70/14, 57, 58, 70/242–244, 209, 158, 207, 163, 164, 166–169, 236, 198–203, 233, 237–239; 180/219, 287

[56] References Cited

U.S. PATENT DOCUMENTS

| | | | |
|---|---|---|---|
| 1,165,352 | 12/1915 | Whiteside | 70/202 |
| 1,293,362 | 2/1919 | Day | 70/200 |
| 1,569,721 | 1/1926 | Dalferes | 70/202 |
| 4,187,702 | 2/1980 | Benton | 70/57 |
| 4,426,861 | 1/1984 | Chillis | 70/203 X |
| 4,825,671 | 5/1989 | Wu | 70/238 |
| 4,870,843 | 10/1989 | Lundberg | 70/233 |
| 5,038,667 | 8/1991 | Slater | 70/238 X |
| 5,179,847 | 1/1993 | Dorn | 70/57 X |
| 5,267,458 | 12/1993 | Heh | 70/238 |
| 5,361,613 | 11/1994 | Fort et al. | 70/202 X |

*Primary Examiner*—Lloyd A. Gall

[57] ABSTRACT

A handlebar hocking device including a pair of tubular members with each having a distal end, a proximal end and a opening therethrough that is capable of receipt therein a handle of a handlebar. Each tubular member has an exterior surface with a ball joint assembly spaced from the proximal end attached thereto. A locking assembly has a box-like configuration with a bottom wall and a pair of proximal side walls having a passage therethrough with a chamber therein. The chamber has a first wall with a locking lever attached thereto and an orifice therethrough with a locking cylinder therein. A first rod is positioned within the locking assembly and engages one of the ball joint assemblies of one of the tubular members. A second rod has an external end engaging one of the ball joint assemblies of one of the tubular members and an internal end with ribbed projections for engaging the locking lever of the locking assembly to secure the locking device on to the handlebar so as to prevent use.

14 Claims, 3 Drawing Sheets

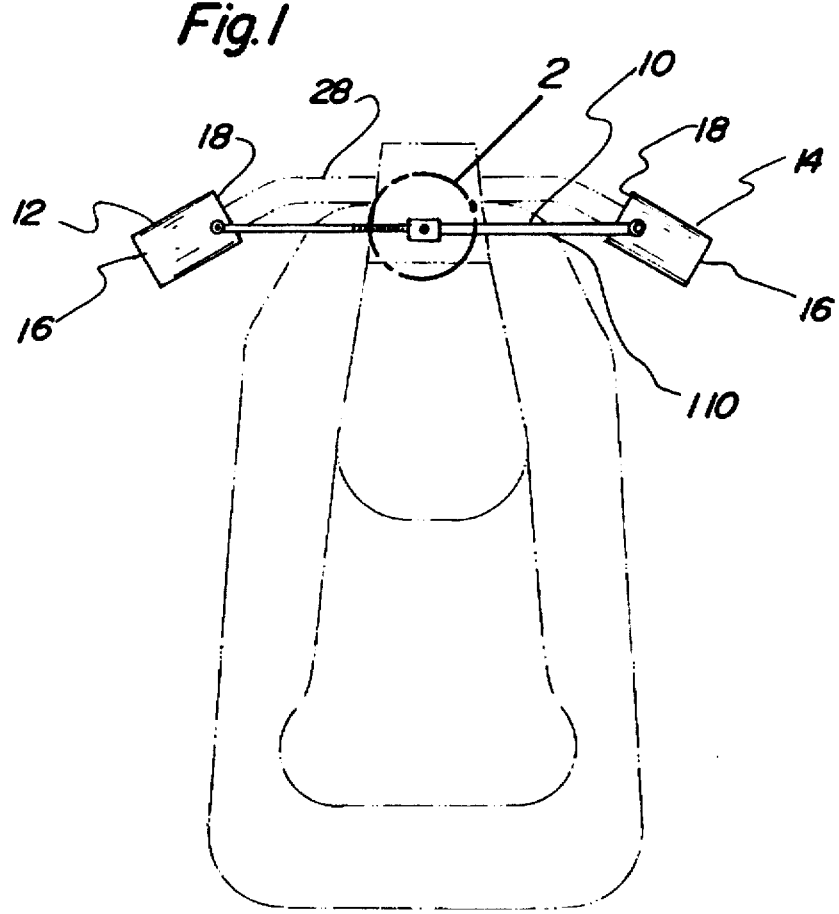
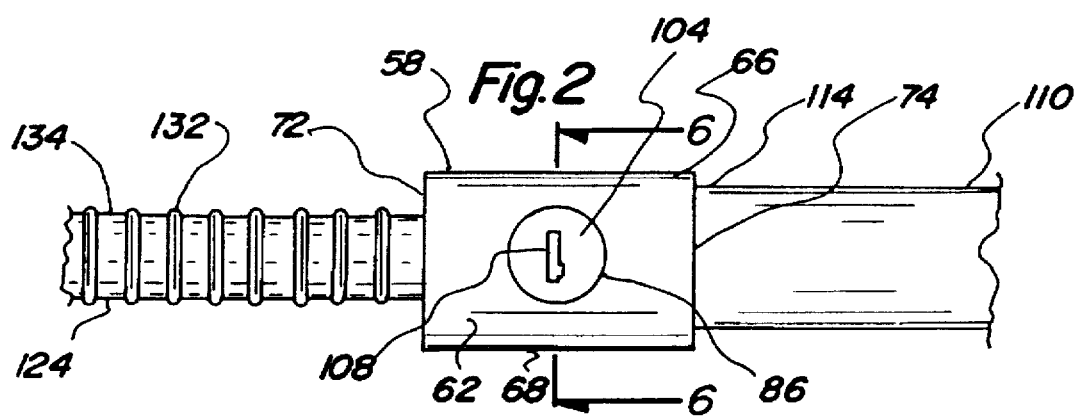

HANDLEBAR LOCKING DEVICE

BACKGROUND OF THE INVENTION

1. Field of the Invention

The present invention relates to a handlebar locking device and more particularly pertains to providing a locking device for placement over the handles of the handlebars of motorcycles, wave runners and jet skis when the vehicles are not in use to lock the handlebars in place and further preventing theft of those vehicles by disallowing access to the throttle attached to the handlebar with the handlebar locking device.

2. Description of the Prior Art

The use of handlebar and control lever locks is known in the prior art. More specifically, handlebar and control lever locks heretofore devised and utilized for the purpose of locking the handlebar, the control lever or both are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,800,575 to Perret discloses a handlebar bicycle lock. U.S. Pat. No. 4,133,193 to Sanada and Shigeo discloses a throttle grip locking device for motorcycles. U.S. Pat. No. 4,426,861 to Chillis discloses a brake lock for motorcycles and the like. U.S. Pat. No. 5,085,063 to Van Dyke and Cluff discloses a bicycle handlebar lock. Lastly, U.S. Pat. No. 5,347,835 to Dewey discloses a control lever lock.

While these devices fulfill their respective, particular objective and requirements, the aforementioned patents do not describe a handlebar locking device that is positionable over both handles of the handlebars to be locked in place for throttle protection and has a pair of rods to secure a pair of tubular members over the handles in a locked position when the rods are placed within the locking assembly.

In this respect, the handlebar locking device according to the present invention substantially departs from the conventional concepts and designs of the prior art, and in doing so provides an apparatus primarily developed for the purpose of providing a locking device for placement over the handles of the handlebars of motorcycles, wave runners and jet skis when the vehicles are not in use to lock the handlebars in place and further preventing theft of those vehicles by disallowing access to the throttle attached to the handlebar with the handlebar locking device.

Therefore, it can be appreciated that there exists a continuing need for a new and improved handlebar locking device which can be used for providing a locking device for placement over the handles of the handlebars of motorcycles, wave runners and jet skis when the vehicles are not in use to lock the handlebars in place and further preventing theft of those vehicles by disallowing access to the throttle attached to the handlebar with the handlebar locking device. In this regard, the present invention substantially fulfills this need.

SUMMARY OF THE INVENTION

In view of the foregoing disadvantages inherent in the known types of handlebar and control lever locks now present in the prior art, the present invention provides an improved Handlebar locking device. As such, the general purpose of the present invention, which will be described subsequently in greater detail, is to provide a new and improved Handlebar locking device and method which has all the advantages of the prior art and none of the disadvantages.

To attain this, the present invention essentially comprises in combination a pair of cylindrical tubular members with each having a distal end, a proximal end and an opening therethrough. Each opening is capable of receipt therein a handle of a handlebar. Each tubular member has a length for allowing complete encapsulation of the handle. Each tubular member has an enlarged inner diameter to encapsulate the handle having a throttle attached thereto. Each tubular member further having an exterior surface with a ball joint assembly spaced from the proximal end attached thereto. Each ball joint assembly has a member, a ball and a socket member. The member has a first end being encased within the ball and a second end being joined to the socket member. Each ball joint assembly allows the tubular members to swivel so as to accommodate the various positions of the handles of the handlebar. A locking assembly is included. The locking assembly has a box-like configuration with a top wall, a bottom wall, a pair of distal side walls and a pair of proximal side walls having a passage therethrough. The passage has a rectangular chamber centrally positioned and formed therein. The chamber has a first wall, a second wall and an orifice extending through to the top wall of the locking assembly. The first wall has a top edge and a bottom edge spaced from the bottom wall with a locking lever capable of movement attached thereto. The chamber has a spacing formed between the locking lever and the first wall. A bias element is positioned within the spacing between the locking lever and the first wall. A locking cylinder within the orifice has an interior radius bar and an exterior key slot accessible from the top wall of the locking assembly. Also included is a first elongated cylindrical rod having an internal end positioned within the locking assembly and an external end engaging one of the ball joint assemblies of one of the tubular members. The first rod has a smooth exterior surface. Lastly, a second elongated cylindrical rod is included. The second rod is positionable within the locking assembly and engaging one of the ball joint assemblies of one of the tubular members. The second elongated cylindrical rod has an external end and an internal end with ribbed projections adjacent thereto encircling a portion of an exterior surface. The ribbed projections for engaging the locking lever of the locking assembly allow the locking lever to press against the bias element when an external force pushes the second rod into the locking assembly. The second rod has a decreased diameter for enabling the first rod to receive the second rod within as it passes through the locking assembly. The ribbed projection engaging of the locking lever secures a portion of the second rod within the locking assembly to an extent necessary to secure each tubular member over the handle and the throttle to prevent use. The locking lever will release the second rod when the key slot of the cylinder being engaged by a key rotates the radius bar to a position for movement of the locking lever beyond the diameter of the second rod.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved handlebar locking device which has all of the advantages of the prior art handlebar and control lever locks and none of the disadvantages.

It is another object of the present invention to provide a new and improved handlebar locking device which may be easily and efficiently manufactured and marketed.

It is a further object of the present invention to provide a new and improved handlebar locking device which is of durable and reliable constructions.

An even further object of the present invention is to provide a new and improved handlebar locking device which is susceptible of a low cost of manufacture with regard to both materials and labor, and which accordingly is then susceptible of low prices of sale to the consuming public, thereby making such Handlebar locking device economically available to the buying public.

Still yet another object of the present invention is to provide a new and improved handlebar locking device which provides in the apparatuses and methods of the prior art some of the advantages thereof, while simultaneously overcoming some of the disadvantages normally associated therewith.

Even still another object of the present invention is to provide a new and improved handlebar locking device for providing a locking device for placement over the handles of the handlebars of motorcycles, wave runners and jet skis when the vehicles are not in use to lock the handlebars in place and further preventing theft of those vehicles by disallowing access to the throttle attached to the handlebar with the handlebar locking device.

Lastly, it is an object of the present invention to provide a new and improved handlebar locking device for use with a motorized vehicle comprising a pair of tubular members with each having a distal end, a proximal end and an opening therethrough being capable of receipt therein a handle of a handlebar. Each tubular member further has an exterior surface with a ball joint assembly spaced from the proximal end attached thereto. A locking assembly has a box-like configuration with a bottom wall and a pair of proximal side walls having a passage therethrough with a chamber therein. The chamber has a first wall with a locking lever attached thereto and an orifice therethrough with a locking cylinder therein. A first rod is positioned within the locking assembly and engages one of the ball joint assemblies of one of the tubular members. A second rod having an external end engaging one of the ball joint assemblies of one of the tubular members and an internal end with ribbed projections for engaging the locking lever of the locking assembly to secure the locking device on to the handlebar so as to prevent use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the handlebar locking device constructed in accordance with the principles of the present invention.

FIG. 2 is an enlarged plan view of the locking assembly at position 2 of FIG. 1—1.

The same reference numerals refer to the same parts through the various Figures.

DESCRIPTION OF THE PREFERRED EMBODIMENT

Figure 3:
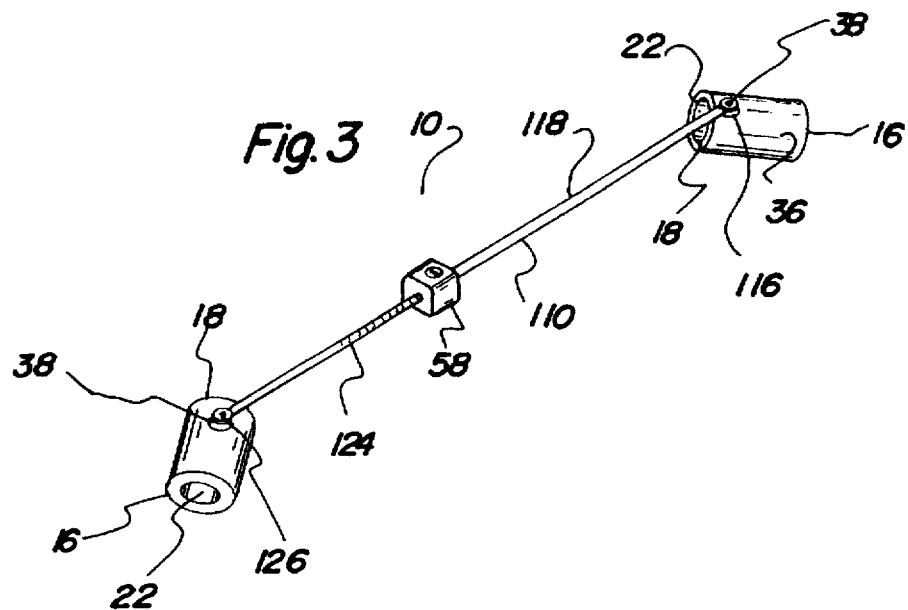
FIG. 3 is an elevational view of the handlebar locking device of the present invention.

With reference now to the drawings, and in particular to FIG. 1 thereof, the preferred embodiment of the new and improved handlebar locking device embodying the principles and concepts of the present invention and generally designated by the reference numeral 10 will be described.

The present invention, the handlebar locking device 10 is comprised of a plurality of components. Such components in their broadest context include tubular members, a locking assembly and rods. Such components are individually configured and correlated with respect to each other so as to attain the desired objective.

Figure 4:
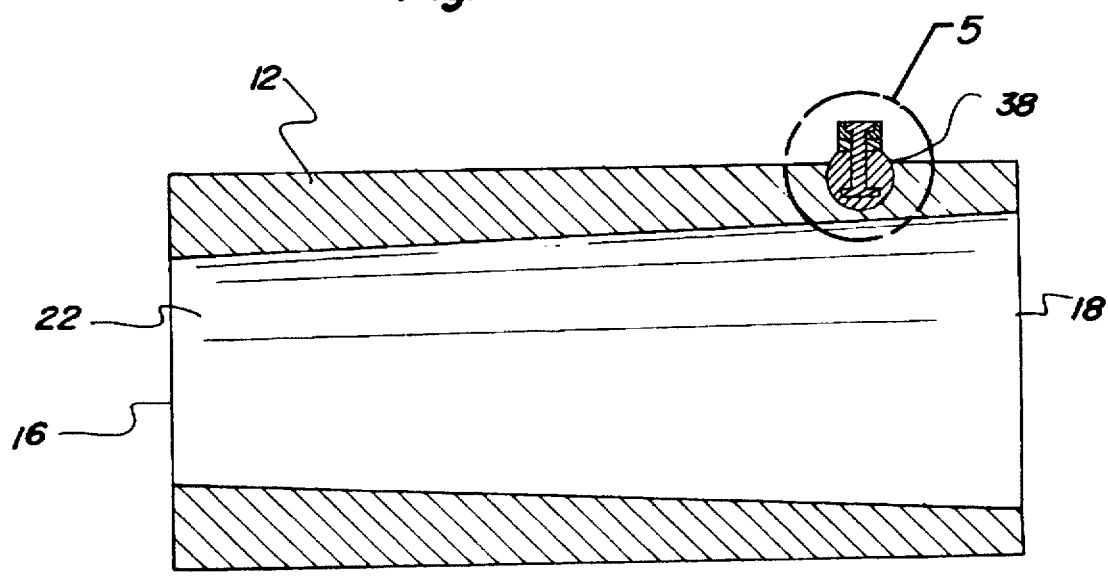
FIG. 4 is a sectional view of the tubular member of the present invention.

Specifically, the present invention includes a pair of cylindrical tubular members 12 and 14, as shown in FIG. 1, with each having a distal end 16, a proximal end 18 and an opening 22 therethrough. FIG. 4 shows the opening passing through one of the tubular members. The tubular members are formed of a rigid material such as metal or plastic. Each opening is capable of receipt therein a handle 2 of a handlebar 28. Each tubular member has a length for allowing complete encapsulation of the handle. Each tubular member has an enlarged inner diameter to encapsulate the handle with a throttle attached thereto. Each tubular member further having an exterior surface 36 with a ball joint assembly 38 spaced from the proximal end 18 attached thereto.

Figure 5:
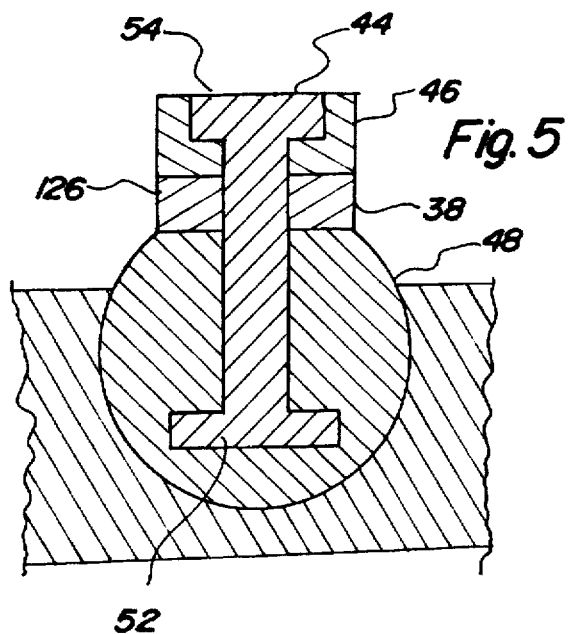
FIG. 5 is an enlarged sectional view of the ball joint assembly at position 5 of FIG. 4.

As best illustrated in FIG. 5, each ball joint assembly 38 has a member 44, a ball 48 and a socket member 46. The member has a first end 52 being encased within the ball and a second end 54 being joined to the socket member. Each ball joint assembly allows the tubular members to swivel so as to accommodate the various positions of the handles of the handlebar.

Figure 6:
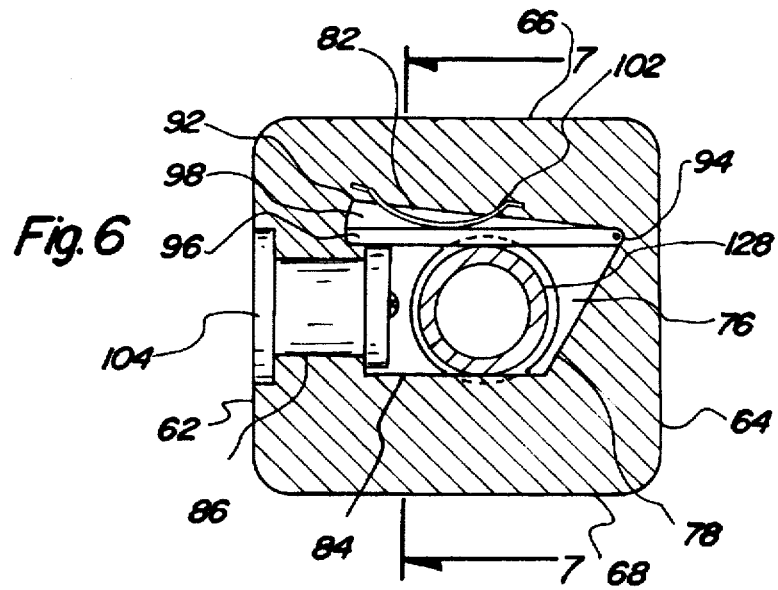
FIG. 6 is an enlarged sectional view of the locking assembly along line 6—6 of FIG. 2.
Figure 7:
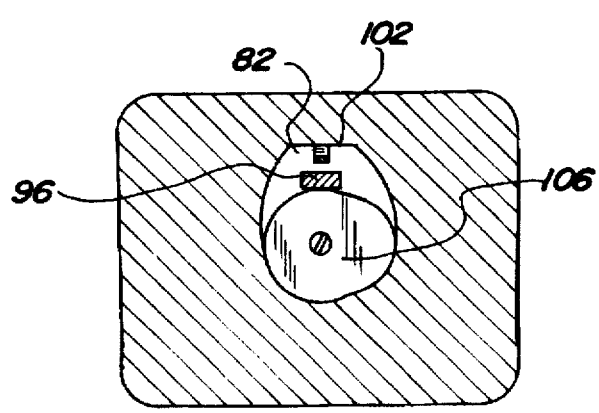
FIG. 7 is an enlarged sectional view of the locking assembly along line 7—7 of FIG. 6.

Also included is a locking assembly 58, as shown in FIG. 2, formed of metal or a metal alloy. The locking assembly has a box-like configuration with a top wall 62, a bottom wall 64, a pair of distal side walls 66 and 68 and a pair of proximal side walls 72 and 74 having a passage 76 therethrough. The passage, as depicted in FIG. 6, has a generally rectangular chamber 78 centrally positioned and formed therein. The chamber has a first wall 82, a second wall 84 and an orifice 86 extending through to the top wall 62 of the locking assembly. The first wall has a top edge 92 and a bottom edge 94 spaced from the bottom wall 64 with a locking lever 96 capable of movement attached thereto. The locking lever is pivotally attached to the back wall in order to allow it to move with a controlled flapping motion along the lever's length. The flapping motion can be termed as up and down from, or forward and backward toward the first wall, which ever is relational. The chamber has a spacing 98 formed between the locking lever and the first wall as shown in FIG. 6. A bias element 102 is positioned within the spacing between the locking lever and the first wall. The bias element is formed of a resilient metal. A locking cylinder 104 within the orifice has an interior radius bar 106, as shown in FIG. 7 and an exterior key slot 108 accessible from the top wall 62 of the locking assembly, as shown in FIG. 2.

To connect one of the tubular members to the locking assembly is a first elongated cylindrical rod 110 having an internal end 114 positioned within the locking assembly and an external end 116 engaging one of the ball joint assemblies 38 of one of the tubular members 14. The first rod has a smooth exterior surface 118 as shown in FIG. 3. The first rod is hollow and formed of a metal or a metal alloy and is integral with one of the proximal side walls 74 of the locking assembly.

Lastly to connect another of the tubular members to the locking assembly a second cylindrical rod 124 is provided as shown in FIG. 3 having an end 126. The second elongated cylindrical rod is positionable within the locking assembly 58 and engaging one of the ball joint assemblies 38 of one of the tubular members 12. The second elongated cylindrical rod has an external end 126 and an internal end 128 with ribbed projections 132 adjacent thereto encircling a portion of an exterior surface 134.

As best illustrated in FIG. 2, the ribbed projections are for engaging the locking lever 96 of the locking assembly 58 allowing the locking lever to press against the bias element 102 when an external force pushes the second rod into the locking assembly. The second rod has a decreased diameter for enabling the first rod to receive the second rod within as the second rod passes through the locking assembly. The ribbed projection's engagement of the locking lever secures a portion of the second rod within the locking assembly to an extent necessary to secure each tubular member 12 and 14 over the handle and the throttle to prevent use.

With the tubular members secured in place by locking the rods, theft is deterred. The locking lever will release the second rod when the key slot 108 of the locking cylinder 104 is engaged by a key to rotate the radius bar 106 to a position that moves the locking lever beyond the diameter of the second rod. The second rod is hollow and formed of a metal or a metal alloy.

The present invention is a handlebar locking device that has tubes that fit over the throttle and handles of the handlebars of a motorized vehicle. Each tube has a rod attached to a proximal end with a ball joint. The ball joint allows the tube to fit the handlebars of wave runners, jet skis and motorcycles no matter what the their positioning on the vehicle. In some instances the handlebars are vertical. In other instances the handles bars are angled in varying degrees inward toward the body of the operator.

The ball joint assembly allows the tubular members to fit handles angled at any position. Each rod fits into a locking assembly. The locking assembly is a commercially available cylindrical locking assembly with a radius bar and a key slot. The first rod is attached to one proximal end of the locking assembly and the second rod is positioned through another proximal end of the locking assembly. The second rod has ribbed projections. The ribbed projections are what secures the locking device to the handlebar. The locking assembly has a locking lever and a bias element contained in a chamber of the locking assembly. The locking assembly further has a locking cylinder contained in an orifice extending from the chamber to the top wall of the locking assembly. The ribbed projections engage the locking lever and can only be released when a key turns the locking cylinder thus turning the radius bar to disengage the locking lever. The device when used on a stationary vehicle with handlebars will deter theft because it is impossible to remove with out damaging the handlebar and throttle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters patent of the U.S. is as follows:

1. A handlebar locking device for use with a motorized vehicle comprising:

a pair of tubular members with each having a distal end, a proximal end and an opening therethrough being capable of receipt therein a handle of a handlebar, each tubular member further having an exterior surface with a ball joint assembly spaced from the proximal end attached thereto;

a locking assembly having a box-like configuration with a bottom wall and a pair of proximal side walls having a passage therethrough with a chamber therein, the chamber having a first wall with a locking lever attached thereto and an orifice with a locking cylinder therein;

a first rod positioned within the locking assembly and engaging one of the ball joint assemblies of one of the tubular members; and a second rod having an external end engaging one of the ball joint assemblies of one of the tubular members and an internal end with ribbed projections for engaging the locking lever of the locking assembly to secure the locking device on to the handlebar so as to prevent use.

2. The handlebar locking device as set forth in claim 1 wherein the tubular members being cylindrical with each having a length for complete encapsulation of the handle and an enlarged inner diameter to encapsulate the handle having a throttle attached thereto.

3. The handlebar locking device as set forth in claim 1 wherein each ball joint assembly has a member, a ball and a socket member, the member having a first end being encased within the ball and a second end being joined to the socket member, each ball joint assembly further allowing the tubular members to swivel as need be to accommodate the handles of the handlebar.

4. The handlebar locking device as set forth in claim 1 wherein the locking assembly has a top wall and a pair of distal side walls.

5. The handlebar locking device as set forth in claim 1 wherein the chamber being generally rectangular in configuration has a second wall and a spacing formed between the locking lever and the first wall.

6. The handlebar locking device as set forth in claim 1 wherein the first wall has a top edge and a bottom edge spaced from the bottom wall with the locking lever attached thereto capable of movement.

7. The handlebar locking device as set forth in claim 1 wherein a bias element being positioned within the chamber between the locking lever and the first wall.

8. The handlebar locking device as set forth in claim 1 wherein the locking cylinder has an interior radius bar positioned within the chamber and an exterior key slot positioned outside of the chamber.

9. The handlebar locking device as set forth in claim 1 wherein the first rod being elongated and cylindrical has an internal end and an external end with a smooth exterior surface.

10. The handlebar locking device as set forth in claim 1 wherein the second rod being elongated and cylindrical has an external end with a smooth exterior surface.

11. The handlebar locking device as set forth in claim 1 wherein the second rod has a decreased diameter enabling the first rod to receive the second therewithin as the second rod passes through the locking assembly.

12. The handlebar locking device as set forth in claim 1 wherein the ribbed projections being adjacent to the internal end and encircling a portion of an exterior surface of the second rod.

13. The handlebar locking device as set forth in claim 1 wherein the ribbed projections being capable of engaging the locking lever of the locking assembly to allow the locking lever to move when an external force pushes the second rod into the locking assembly and allowing the locking assembly to secure a portion of the second rod within the locking assembly.

14. A new and improved handlebar locking device for use with a motorized vehicle from the class of vehicles having a handlebar such as wave runners, jet skis and motorcycles comprising, in combination:

a pair of cylindrical tubular members with each having a distal end, a proximal end and an opening therethrough, each opening being capable of receipt therein a handle of a handlebar, each tubular member having a length for allowing complete encapsulation of the handle, each tubular member having an enlarged inner diameter to encapsulate the handle having a throttle attached thereto, each tubular member further having an exterior surface with a ball joint assembly spaced from the proximal end attached thereto;

each ball joint assembly having a member, a ball and a socket member, the member having a first end being encased within the ball and a second end being joined to the socket member, each ball joint assembly allows the tubular members to swivel so as to accommodate the various positions of the handles of the handlebar;

a locking assembly having a box-like configuration with a top wall, a bottom wall, a pair of distal side walls and a pair of proximal side walls having a passage therethrough, the passage having a generally rectangular chamber centrally positioned and formed therein, the chamber having a first wall, a second wall and an orifice extending through to the top wall of the locking assembly, the first wall having a top edge and a bottom edge spaced from the bottom wall with a locking lever capable of movement attached thereto, the chamber having a spacing formed between the locking lever and the first wall, a bias element positioned within the spacing between the locking lever and the first wall, a locking cylinder within the orifice having an interior radius bar and an exterior key slot accessible from the top wall of the locking assembly;

a first elongated cylindrical rod having an internal end positioned within the locking assembly and an external end engaging one of the ball joint assemblies of one of the tubular members, the first rod having a smooth exterior surface; and a second elongated cylindrical rod positionable within the locking assembly and engaging one of the ball joint assemblies of one of the tubular members, the second elongated cylindrical rod having an external end and an internal end with ribbed projections adjacent thereto encircling a portion of an exterior surface, the ribbed projections for engaging the locking lever of the locking assembly allowing the locking lever to press against the bias element when an external force pushes the second rod into the locking assembly, the second rod having a decreased diameter for enabling the first rod to receive the second rod therewithin as it passes through the locking assembly, the ribbed projection engaging of the locking lever secures a portion of the second rod within the locking assembly to an extent necessary to secure each tubular member over the handle and the throttle to prevent use, the locking lever will release the second rod when the key slot of the cylinder being engaged by a key rotates the radius bar to a position for movement of the locking lever beyond the diameter of the second rod.

* * * * *